XR 3,700,787

United States Patent [15] 3,700,787

Arumugham [45] Oct. 24, 1972

[54] LINE VOLTAGE COMPENSATING CIRCUITRY FOR RGB COLOR DRIVE SYSTEM

[72] Inventor: Rangaswamy Arumugham, Oakfield, N.Y.

[73] Assignee: GTE Sylvania Incorporated

[22] Filed: Jan. 7, 1971

[21] Appl. No.: 104,601

[52] U.S. Cl. ..........................178/5.4 R, 178/DIG. 11
[51] Int. Cl. ..........................................H04n 9/20
[58] Field of Search .178/5.4 R, 5,4 AC, 7.3 R, 7.5 R, 178/7.3 DC, 7.5 DC, DIG. 11; 315/30; 328/267

[56] References Cited

UNITED STATES PATENTS 2,800,528 7/1957 Beste ......................178/7.5 R
3,555,175 1/1971 Griepentrog...........178/5.4 R

*Primary Examiner*—Robert L. Richardson
*Attorney*—Norman J. O'Malley, Robert W. Walrath and Thomas H. Buffton

[57] ABSTRACT

A color television receiver employing an RGB color drive system wherein a plurality of color amplifier stages are each coupled to a color cathode ray tube electrode, to a source of video signals, to a source of color difference signals, and to an unregulated potential source. Feedback circuitry couples the unregulated potential source to the video signal whereby variations in the unregulated potential source, due to line voltage changes, applied to the color cathode ray tube electrodes are also applied to the video signal source to effect variations in the DC gain thereof providing compensation for the potential source variations applied to the color cathode ray tube electrodes.

7 Claims, 2 Drawing Figures

INVENTOR.
RANGASWAMY ARUMUGHAM
BY
Robert E. Walrath
ATTORNEY

INVENTOR.
RANGASWAMY ARUMUGHAM
BY
Robert E. Walrath
ATTORNEY

LINE VOLTAGE COMPENSATING CIRCUITRY FOR RGB COLOR DRIVE SYSTEM

BACKGROUND OF THE INVENTION

Color television receivers normally employ one of two types of composite video drive systems, i.e. color difference signal drive systems and color or red, green, and blue (RGB) drive systems. The color difference signal drive system provides video signals which are applied to one set of electrodes, cathodes for instance, of the color cathode ray tube and color difference signals which are applied to another set of electrodes, control grids, of the color cathode ray tube. The video signals (Y-signals) and the color difference signals (R–Y, B–Y, and G–Y signals) are combined within the color cathode ray tube to provide signals representative of color information wherefrom color image reproductions are obtained.

In color (RGB) drive systems, video or "Y" signals representative of luminance information and color difference signals or R–Y, B–Y, and G–Y signals representative of chrominance information are applied to a plurality of color amplifier stages. The color amplifier stages provide color or RGB signals which are applied to one set of electrodes, cathodes for instance, of a color cathode ray tube. Another set of electrodes, control grids, of the color cathode ray tube are coupled at or near ground potential.

Since brightness variations, due to line voltage changes, are particularly noticeable to a viewer of a television receiver, it is important to minimize such variations. In the color difference signal drive system, variations in line voltage tend to alter the potential source or B+ potential associated with the video or luminance signal applied to one set of electrodes of the color cathode ray tube. These same potential variations are applied, in combination with color signals, to the other set of electrodes of the color cathode ray tube. Thus, the potential variations are applied to both sets of electrodes and tend to track one another whereby undesired variations in bias and in brightness of the color cathode ray tube are in essence cancelled or greatly inhibited.

However, in an RGB color drive system variations in line voltage tend to cause variations in the potential source which, in turn, affect the signal level causing variations in brightness and in the potentials applied to a first set of electrodes of the color cathode ray tube. Moreover, this undesired variation in potentials does not appear at the second set of electrodes of the color cathode ray tube which are coupled at or near ground potential. Thus, there is no potential tracking capability and a viewer of the television receiver is subjected to undersired variations in brightness of the viewed image.

One known technique for minimizing the above-mentioned undesired variations in line potential, power source potential, and brightness is to incorporate a regulated power source into the system. Unfortunately, regulated power sources are relatively expensive due to the relatively high power required in video drive systems.

OBJECTS AND SUMMARY OF THE INVENTION

It is an object of the present invention to provide an enhanced RGB color drive system for a color television receiver. Another object of the invention is to provide improved circuitry compensating for variations in line voltage. Still another object of the invention is to inhibit brightness variations in an RGB color drive system when line voltage variations occur.

These and other objects, advantages and capabilities are achieved in one aspect of the invention by an RGB color drive system for a color television receiver wherein a plurality of color amplifier stages are coupled to a video signal source, a color difference signal source, a color cathode ray tube electrode, and a potential source. A feedback means couples variations in the potential source to the video signal source to effect variations in the gain thereof whereby the gain variations compensate for the potential source variations causing a substantially unchanged value of brightness of the color cathode ray tube.

PREFERRED EMBODIMENT OF THE INVENTION

For a better understanding of the present invention, together with other and further objects, advantages and capabilities thereof, reference is made to the following disclosure and appended claims in connection with the accompanying drawings.

Figure 1:
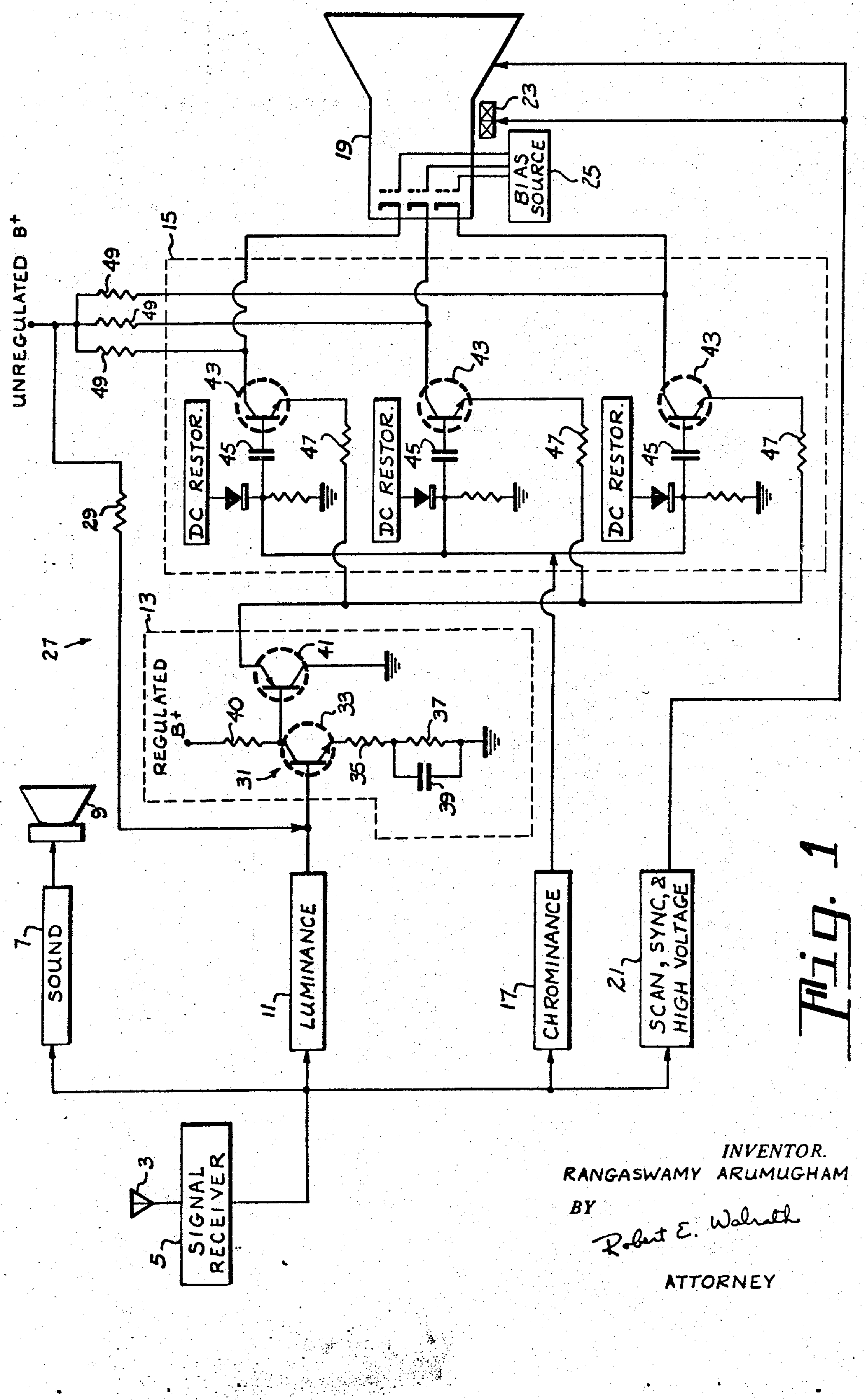
FIG. 1 is a diagrammatic illustration, in block and schematic form, of an RGB drive system for a color television receiver employing a preferred embodiment of the invention.

Referring to FIG. 1 of the drawings, a color television receiver includes an antenna 3 for intercepting and applying transmitted composite color signals to a signal receiver 5. The signal receiver 5 includes the usual RF and IF amplification, detection, and mixer stages and provides an output signal which is applied to a sound channel 7 wherefrom signals representative of audio information are applied to a loudspeaker 9 in a well known manner.

Another output signal from the signal receiver 5 is applied to a luminance channel 11. The luminance channel 11 provides a video or "Y" signal representative of brightness information which is applied to a video signal source 13. In turn, signals from the video signal source 13 are applied to a plurality of parallel coupled color amplifiers 15.

Still another output signal from the signal receiver 5 is applied to a chrominance channel 17 wherein signals representative of color difference information (R–Y, B–Y, and G–Y) are derived and applied to the plurality of parallel coupled color amplifiers 15. Each one of the plurality of parallel coupled color amplifiers 15 is coupled to an unregulated potential source B+ and develops signals representative of red, green, and blue colors which are individually applied to a cathode electrode of a color cathode ray tube 19.

A further output signal from the signal receiver 5 is applied to synchronizing, scanning, and high voltage circuitry 21 wherefrom signals are applied to deflection apparatus 23 associated with the color cathode ray tube 19 and to the color cathode ray tube 19. Moreover, the color cathode ray tube 19 has a plurality of control grid electrodes each of which is coupled to a bias source 25 at or near ground potential.

In addition, a feedback circuit means 27 couples the unregulated potential source B+ to the input circuitry of the video signals source 13. Moreover, the feedback circuit means 27 includes an impedance which is preferably in the form of a resistor 29.

More specifically, the video signal source 13 includes a video amplifier stage 31 having a transistor 33 with base, emitter, and collector electrodes. The base electrode is coupled to the luminance channel 11. The emitter electrode is coupled to a first resistor 35 connected to a second resistor 37 shunted by a by-pass capacitor 39 and coupled to a potential reference level. The collector electrode is coupled via a resistor 40 to a regulated potential source B+, and via an emitter follower stage 41 to the plurality of parallel coupled color amplifiers 15.

Each one of the plurality of parallel coupled color amplifiers 15 includes a transistor 43 having a first signal input or base electrode coupled by a capacitor 45 to the chrominance channel 17. The second signal input electrode or emitter of each of the transistors 43 is coupled by a resistor 47 to the video signal source 13. The output electrode or collector of each of the transistors 43 is coupled to a cathode electrode of the color cathode ray tube 19 and via a resistor 49 to the unregulated potential source B+.

In operation, video signals available from the video signal source 13 and color difference signals available from the chrominance channel 17 are applied to each one of the plurality of color amplifiers 15. Therein, a signal representative of one of the colors red, blue, and green is developed and applied to individual cathode electrode of the color cathode ray tube 19.

Further, each one of the cathode electrodes of the color cathode ray tube 19 is coupled via a resistor 49 to the unregulated power supply B+. Also, each one of the control grid electrodes of the color cathode ray tube 19 is coupled to the bias source 25 which is at or near ground or the potential reference level. Thus, it can be seen that a variation in line voltage would cause a similar variation in the unregulated potential source B+. Moreover, this variation in the unregulated potential source B+ would be applied to the cathode electrodes of the color cathode ray tube 19 causing a variation in bias level and a consequent variation in brightness of the color cathode ray tube 19.

However, the above-mentioned variation in potential of the unregulated potential source B+ is transmitted by way of the feedback circuit means 27 including resistor 29 to the input of the video signal source 13. Therein, an increase in potential of the unregulated potential source B+ causes an increase in current flow through the amplifier stage 31. Since the second resistor 37 is preferably large compared with the first resistor 35 and by-passed by the capacitor 39, the increased current flow causes an increased bias potential reducing the DC gain of the amplifier stage 31 to a greater extent than the AC gain increase of the stage 31.

The reduced DC gain of the amplifier stage 31 causes application of a reduced potential to the emitter electrodes of each one of the transistors 43 of the color amplifiers 15. Thereupon, current flow through the resistors 49 is increased whereupon the potential applied to the cathode electrodes of the color cathode ray tube 19 is reduced. Thus, an increase in potential of the unregulated potential source B+ is accompanied by a compensating decrease in DC gain of the video signal source means 13 and a compensating reduction in potential applied to the cathode electrodes of the color cathode ray tube 19. As a result, the brightness level of the color cathode ray tube 19 remains substantially unchanged even though line voltage variations and the unregulated potential source B+ variations occur.

Figure 2:
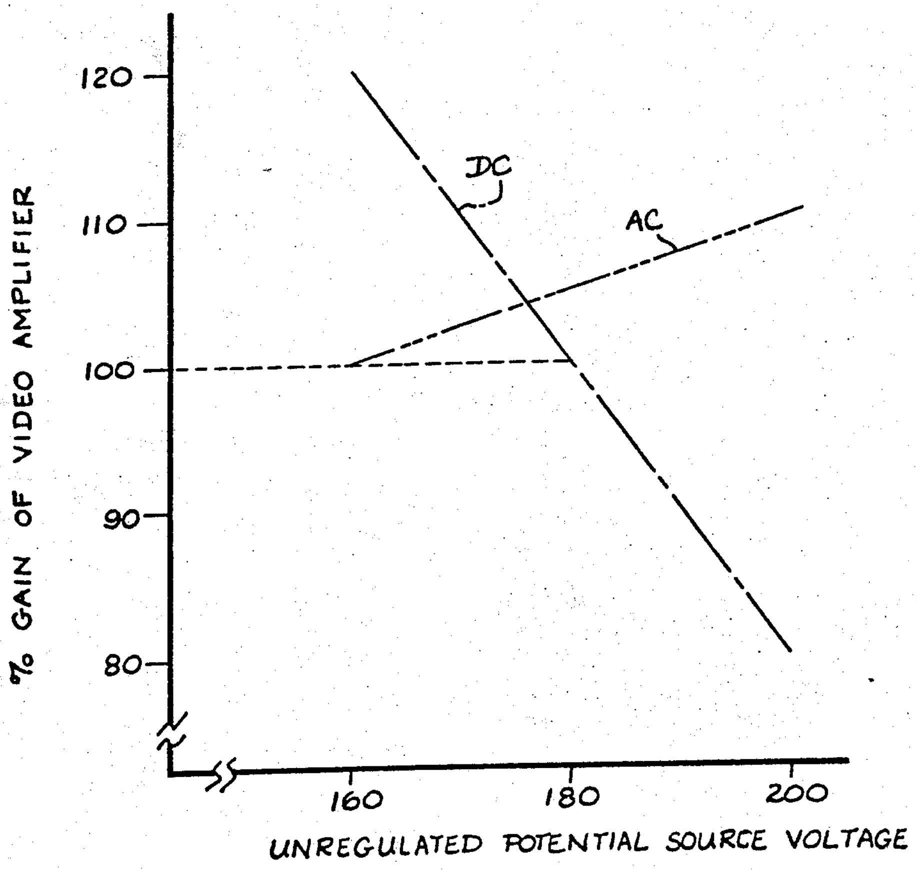
FIG. 2 is a chart illustrating the relative AC and DC gain variations in response to feedback circuitry coupled to a varying unregulated potential source.

Additionally, FIG. 2 graphically illustrates the percentage DC and AC gain of the video amplifier stage 31 in accordance with the variations in the unregulated potential source B+. As can readily be seen, the resistor values are chosen such that the AC gain remains relatively flat over a limited range of unregulated potential source B+ variation while the DC gain is mostly controlled by the relatively large second resistor 37 which is bypassed insofar as AC gain is concerned.

Typical, but not limiting, values appropriate to one embodiment of the above-discussed circuitry are as follows:

| | |
|---|---|
| R–35 | 56Ω |
| R–37 | 298Ω |
| R–40 | 820Ω |
| R–47 | 220Ω |
| R–49 | 6.8KΩ |
| C–39 | 560 Pf |
| C–45 | 0.1 uuf |
| B+(regulated) | 19ᵛ |
| B+(unregulated) | 180ᵛ |
| Transistor 33 | 2N3694 |
| Transistor 43 | D40N1 |

Thus, there has been provided a unique line voltage compensating circuit for a RGB drive system in a color television receiver. The circuitry permits utilization of a relatively inexpensive unregulated potential source and inhibits undesired variations in brightness of the color cathode ray tube when line voltage variations occur. Moreover, the circuitry is inexpensive of components and relatively free from component failure or shift.

While there has been shown and described what is at present considered the preferred embodiment of the invention, it will be obvious to those skilled in the art that various changes and modifications may be made therein without departing from the invention as defined by the appended claims.

I claim:

1. In a color television receiver having an RGB color drive system and employing a color cathode ray tube having cathode and control grid electrodes with the control grid electrodes coupled to a substantially constant bias potential, varying line voltage compensating circuitry comprising:

an unregulated potential source;

video signal source means;

color difference signal source means;

a plurality of color amplifier stages each AC coupled to said color difference signal source means and DC coupled to said unregulated potential source, said video signal source means, and to a cathode electrode of said color cathode ray tube; and feedback means in the form of an impedance DC coupling a potential from said unregulated potential source to said video signal source means to effect alterations in the DC gain thereof in accordance with the variations in potential of said unregulated potential source whereby said DC gain variations substantially cancel said unregulated potential source variations to effect application of a substantially constant DC potential to said cathode electrode of said color cathode ray tube.

2. The line voltage compensating circuitry of claim 1 wherein said video signal source includes an amplifier stage having an output electrode coupled to said color amplifier stages and an input electrode coupled by said feedback means to said unregulated potential source.

3. The line voltage compensating circuitry of claim 1 wherein said color amplifier stages are each in the form of an electron device having a first input circuit coupled to said color difference signal source means, a second input circuit coupled to said video signal source means, and an output circuit coupled to said unregulated potential source, said video signal source means and said cathode electrode of said color cathode ray tube.

4. The line voltage compensating circuitry of claim 1 wherein said impedance of said feedback means is in the form of a resistor.

5. Varying line voltage compensating circuitry for a color television receiver utilizing an RGB color drive system having a color cathode ray tube with a plurality of cathode electrodes and control grid electrodes wherein the control grid electrodes are coupled to a substantially constant bias potential source comprising:

an unregulated potential source;

means for providing video signals;

means for providing signals representative of color difference information;

a plurality of color amplifier means each coupled to said unregulated potential source, said means for providing video signals, said means for providing signals representative of color difference information, and to a cathode electrode of said color cathode ray tube; and potential feedback means DC coupling said unregulated potential source to said means for providing video signals to effect alterations in DC gain thereof in accordance with alterations in said unregulated potential source whereby potential variations at the cathode electrodes of the color cathode ray tube due to line voltage variations are essentially cancelled by increased DC voltage gain potentials of said video signal source in response to potentials from said potential feedback means.

6. The line voltage compensating circuitry of claim 5 wherein said potential feedback means includes a resistor coupling said unregulated potential source to said means for providing video signals.

7. The line voltage compensating circuitry of claim 5 wherein each of said plurality of color amplifier means is in the form of an electron device having a first input electrode coupled to said means for providing signals representative of color difference information; a second input electrode coupled to said means for providing video signals; and an output electrode coupled to an electrode of said color cathode ray tube and to said unregulated potential source.

* * * * *